United States Patent
Henke (10) Patent No.: US 9,732,865 B2
(45) Date of Patent: Aug. 15, 2017

(54) SWITCH FOR AN OPERATING MATERIAL

(71) Applicant: HENKEL AG & CO. KGAA, Dusseldorf (DE)

(72) Inventor: Andreas Henke, Hellwege (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/654,036

(22) PCT Filed: Dec. 3, 2013

(86) PCT No.: PCT/EP2013/075389
§ 371 (c)(1),
(2) Date: Jun. 19, 2015

(87) PCT Pub. No.: WO2014/095350
PCT Pub. Date: Jun. 26, 2014

(65) Prior Publication Data
US 2015/0345648 A1 Dec. 3, 2015

(30) Foreign Application Priority Data

Dec. 20, 2012 (DE) .................. 10 2012 224 061

(51) Int. Cl.
*B64C 25/50* (2006.01)
*F16K 11/074* (2006.01)
(Continued)

(52) U.S. Cl.
CPC ............ *F16K 11/074* (2013.01); *B65G 53/56* (2013.01); *Y10T 137/86493* (2015.04); *Y10T 137/86847* (2015.04)

(58) Field of Classification Search
CPC .......... F16K 11/074; Y10T 137/86501; Y10T 137/86863; Y10T 137/87804; Y10T 137/86533; Y10T 137/86566; B65G 53/56

See application file for complete search history.

(56) References Cited

U.S. PATENT DOCUMENTS 3,581,768 A * 6/1971 Conti ................... F16K 11/072
137/625.15
3,863,668 A * 2/1975 Waters ................... F16K 27/00
137/375
(Continued)

FOREIGN PATENT DOCUMENTS

AU 199915468 B2 8/1999
DE 4009218 A1 9/1991
(Continued)

OTHER PUBLICATIONS

International Search Report for PCT/EP2013/075389 dated Feb. 5, 2014.

*Primary Examiner* — Craig Schneider
*Assistant Examiner* — Kevin Barss
(74) *Attorney, Agent, or Firm* — James E. Piotrowski (57) ABSTRACT

The invention relates to a switch (1) for an operating material, comprising an inlet opening (3) for introducing an operating material into an inlet side (2), and several outlet openings (5) for discharging the operating material to an outlet side (4). An actuator (6) comprising a connecting channel (7) is arranged between the inlet side (2) and the outlet side (4), said actuator can be adjusted such that the connecting channel (7) can connect the inlet opening (3) to one of the outlet openings (5). Said actuator (6) consists of at least two parts (9, 10), and the connecting channel (7) is defined, at least in sections, by both parts (9, 10) of the actuator (31, 32, 33, 34).

20 Claims, 5 Drawing Sheets (51) Int. Cl.
*F16K 27/04* (2006.01)
*B65G 53/56* (2006.01)

(56) References Cited

U.S. PATENT DOCUMENTS

| | | | | |
|---|---|---|---|---|
| 4,265,267 A * | 5/1981 | Cyphelly | ................ | F04C 14/26 |
| | | | | 137/115.05 |
| 5,127,429 A * | 7/1992 | Kempf | ................... | B65G 53/32 |
| | | | | 137/240 |
| 5,188,151 A * | 2/1993 | Young | ................... | B65G 53/56 |
| | | | | 137/874 |
| 5,927,330 A * | 7/1999 | Minton | ................ | F16K 11/076 |
| | | | | 137/625.11 |
| 7,131,459 B2 * | 11/2006 | Beswick | .............. | A61C 1/0061 |
| | | | | 137/625.11 |
| 7,631,661 B2 * | 12/2009 | Moreno | ................ | F16K 11/074 |
| | | | | 137/625.43 |
| 2005/0236051 A1 * | 10/2005 | McBeth | ................ | F16K 11/074 |
| | | | | 137/625.11 |

FOREIGN PATENT DOCUMENTS

| | | | |
|---|---|---|---|
| DE | 69927309 | T2 | 6/2006 |
| DE | 202012101232 | U1 | 6/2012 |
| JP | 2002154653 | A | 5/2002 |
| WO | 2005108831 | A2 | 11/2005 |
| WO | 2013105021 | A1 | 7/2013 |

\* cited by examiner

SWITCH FOR AN OPERATING MATERIAL

CROSS-REFERENCE TO RELATED APPLICATION

This application is entitled to the benefit of and incorporates by reference subject matter disclosed in International Patent Application No. PCT/EP2013/075389 filed on Dec. 3, 2013 and German Patent Application 10 2012 224 061.6 filed Dec. 20, 2012.

TECHNICAL FIELD

The present invention relates to a switch for an operating material, in particular a bulk material, in particular a granulate. These types of switches are used in particular in the form of tube switches for bulk materials, in particular in pneumatic conveyor systems, and are used for either converting two or more conveying lines into one conveying line, or vice versa. There are many possible design principles and types of construction for such switches. In particular sliding switches, hose switches, rotary switches, or rotational switches are known in the prior art which are used depending on the intended purpose.

BACKGROUND

For example, DE 202012101232 U1 discloses a sliding tube switch for a granulate, comprising a housing, a first, second, and third connector provided on the housing, a valve body which is movably guided back and forth in the housing, and which in a first position connects the first connector to the second connector, and in a second position connects the first connector to the third connector, at least one pressure chamber which is delimited by the housing and the valve body, and an antitwist element which secures the valve body from twisting about the sliding axis.

In addition, DE 1556320 discloses a rotary tube switch for selectively connecting an incoming tube to one or multiple outgoing tubes, comprising a rotary tube which with its exiting end is connected to the edge zone of a rotary table for pivoting about the axis of the incoming tube, and which for the displacement operation is liftable from a stationary base plate which bears the outgoing connector in a circular arrangement, and afterwards is once again pressable against same.

Furthermore, DE 1756198 discloses a rotary tube switch in which, for the pivoting motion, the rotary table which guides the rotary tube is liftable from the base plate holding the outgoing connectors, wherein a clearing device for removing the residues of conveyed material which exit from the tube connecting points during the lifting is situated between the rotary table and the base plate.

DE 8427126 U1 once again discloses a rotary tube switch for selectively connecting an incoming tube to one or multiple outgoing tubes, having a carrier, which is rotatably pivotable about a central center axis, for sealing areas that are provided for closing off the unused tube outlets, wherein the carrier is displaceable by means of a servomotor in the direction of the center axis for pressing the sealing areas against the adjacent openings of the outgoing tubes, and for lifting off therefrom.

All of the disclosed switches have a more or less complex design, and may be demanding in terms of the manufacturing process. In addition, limits may be imposed, in particular on different sizes.

SUMMARY

The object of the present invention, therefore, is to provide an improved switch.

This object is achieved by a switch for an operating material comprising an inlet opening for supplying an operating material at an inlet side, and a plurality of outlet openings for discharging the operating material at an outlet side, wherein an actuator having a connecting channel is provided between the inlet side and the outlet side, and is adjustable in such a way that an option for connecting the inlet opening to one of the outlet openings can be provided via the connecting channel, wherein the actuator is made up of at least two parts, the connecting channel) being defined, at least in areas, by both parts of the actuator.

The basic concept of the invention is the use of a switch for an operating material, comprising an inlet opening for supplying an operating material at an inlet side, and a plurality of outlet openings for discharging the operating material at an outlet side, wherein an actuator having a connecting channel is provided between the inlet side and the outlet side, and is adjustable in such a way that an option for connecting the inlet opening to one of the outlet openings can be provided via the connecting channel, in particular to transport the operating material from the inlet opening to the selected outlet opening(s), the actuator being made up of at least two parts, and the connecting channel being defined, at least in areas, in particular one or more walls which delimit the connecting channel, by both or all parts of the actuator.

However, the switch may of course be configured in such a way that, for example, a branch is provided, so that the inlet opening is connectable to two or more outlet openings in each case. In addition, multiple inlet openings may be provided which are connectable to different outlet openings. In one embodiment, it is also provided to use the switch in the opposite manner, so that the inlet opening is utilized as an outlet for the operating material, and the outlet openings are utilized as an inlet for the operating material.

In particular a flowable operating material, for example a granulate, may be used as the operating material. A granulate may be understood in particular to mean a granular to powdery, in particular easily flowable, solid. In one alternative embodiment, however, generally pumpable operating materials which are miscible with a gaseous transport medium may also optionally be conveyed. However, the use of an operating material in granulate form has proven to be particularly advantageous, since a granulate is easily conveyable by means of a gaseous transport medium. For example, a hot melt adhesive in granulate form is used which has applications in particular in packaging technology for producing cardboard boxes or similar packaging materials. These types of granulates are usually stored in large supply stores or storage tanks and supplied to different processing stations for further processing. By use of a switch according to the invention, for example a plurality of processing stations may be supplied with the granulate by a supply store by connecting a supply line, fed from the supply store, to the inlet opening of the switch, and in turn connecting the outlet openings in each case to feed lines connected to corresponding processing stations. By using an electronic control system, which may be part of the switch, the above-mentioned actuator may be adjusted in such a way that feeding of a specific processing station with the operating material is possible.

The actuator having the connecting channel is adjustable, in particular displaceable, shiftable, or rotatable, with respect to the openings in such a way that the area of the connecting channel facing the inlet side may be brought into contact with the inlet opening, and the oppositely situated area of the connecting channel facing the outlet side may be brought into contact with an outlet opening selected depending on the adjustment of the actuator, so that a communication option for transporting the operating material from the inlet opening to one or more of the outlet openings can be made possible by means of the connecting channel. According to the invention, the actuator is made up of at least two parts, the connecting channel being defined, at least in areas, in particular at least one or more walls which delimit the connecting channel, by both parts of the actuator. This design may be advantageous in many respects.

For example, this type of design allows, at least in areas, the connecting channel to be situated in particular completely in the area of the interface, i.e., the contact surface of the first part with the second part. The connecting channel is preferably formed only by putting the two or more parts together. Thus, the connecting channel may be formed, for example, by recesses in one or more parts, or by one or more recesses in a first part and a corresponding wall section of a second part which provides a wall of the connecting channel in the assembled state of the actuator. In particular production of the actuator may be made possible, since a configuration of the connecting channel by utilizing several of the parts is possible due to the above-described multi-part design of the actuator. In particular, the parts of the actuator may be made of a solid material, such as a metallic material or a plastic material, at least in one of the parts, at least in sections, one or more recesses being provided which define the connecting channel. A suitable division of the actuator into individual parts allows provision of the connecting channel, wherein with regard to the above-mentioned contact surface or contact surfaces, undercuts in the design of the recesses may be avoided, which may result in simplified manufacture, machining, and maintenance of the actuator. The recesses may be introduced into the parts by suitable manufacturing methods. Thus, the parts having recesses may already be provided with same in the primary forming process. In particular, depending on the material of the part and/or of the actuator, suitable primary forming processes which are known to those skilled in the art are conceivable here, in particular casting of metallic materials or injection molding of plastic materials. Alternatively, the recesses may of course also be introduced into one more parts by a machining method, in which the material is brought into the desired shape, and excess material in the shape is removed. In particular machine cutting is conceivable here as a mechanical machining method. Of course, other machining methods known to those skilled in the art are also suitable here.

In one advantageous refinement, the connecting channel is therefore defined by at least one recess in one of the parts of the actuator. This recess may in particular have been designed and produced as described above.

In one advantageous refinement, the connecting channel is defined, at least in sections, by recesses in two adjoining parts of the actuator, which in the installed state of the parts preferably are situated opposite one another and thus form the channel.

A further advantage is the mirror-symmetrical design, at least in areas, of the recesses in both adjoining parts.

In one advantageous refinement, a recess of a first part extends from the contact surface thereof with an adjoining second part in a direction of extent into the first part, wherein the clearance of the recess from the surface in the direction of extent is constant or becomes smaller, in particular to avoid undercuts and thus ensure ease of production.

One advantageous refinement of the invention provides that the actuator is rotatable about a rotational axis which preferably extends through the inlet opening, particularly preferably coaxially with respect to the preferably circular or cylindrical inlet opening, the connecting channel, at least on its side facing the inlet side, being aligned with the inlet opening. The connecting channel on its side facing the inlet side preferably has a shape that corresponds to the inlet opening. Accordingly, if the inlet opening has a circular cross section, the shape of the connecting channel in this area is preferably also circular. With such a design, for example a switch may be provided in which the actuator on the one hand is rotatable about the rotational axis. On the other hand, in particular when a circular inlet opening is selected, the actuator is also rotatable about the inlet opening, wherein for a corresponding, preferably circular design of the section of the connecting channel which adjoins the inlet opening and which is aligned with the inlet opening, in a manner of speaking a rotation of the actuator about the inlet opening and about the section of the connecting channel takes place.

A further advantage is the configuration of the actuator such that the contact surface extends in parallel to the rotational axis. It has proven to be advantageous that the contact surface is formed as a plane, or has a flat surface at least in areas. It may be conceivable for the rotational axis to extend over the contact surface, i.e., to lie within the contact surface. In one variant it may prove useful for the rotational axis to be separated at a distance from the contact surface, but to extend in parallel to same.

In one advantageous refinement, the rotational axis extends through the opening of the connecting channel at its side on the actuator facing the inlet side. For a circular or oval shape of the connecting channel, this may in particular be the center point.

A further advantage is the configuration of the connecting channel such that the connecting channel extends, from the side of the actuator facing the inlet side to the opposite side of the actuator facing the outlet side, through the actuator, such that the distance of the connecting channel from the rotational axis increases, at least in areas, in this direction. The distance preferably no longer decreases in this direction of extent. The connecting channel particularly preferably extends through the actuator in such a way that only soft roundings and no sharp corners or edges are provided, in order to avoid obstructions and thus minimize the resistance for the operating material to be conveyed.

In one advantageous refinement, the actuator of the switch has at least one pressure medium channel, in particular a compressed air channel, which opens into the connecting channel via a channel opening to be able to supply a gaseous pressure medium, in particular compressed air, into the connecting channel. Alternatively, it is possible to provide such a channel in order to act on the connecting channel in particular with a liquid medium, in particular for cleaning. The pressure medium channel may once again be defined, at least in areas, by the parts of the actuator. The design features concerning the connecting channel in this respect are to be applied to the pressure medium channel described here.

BRIEF DESCRIPTION OF THE DRAWINGS

The invention is illustrated by way of example with reference to the appended drawings, which show the following.

DETAILED DESCRIPTION

Figure 1:
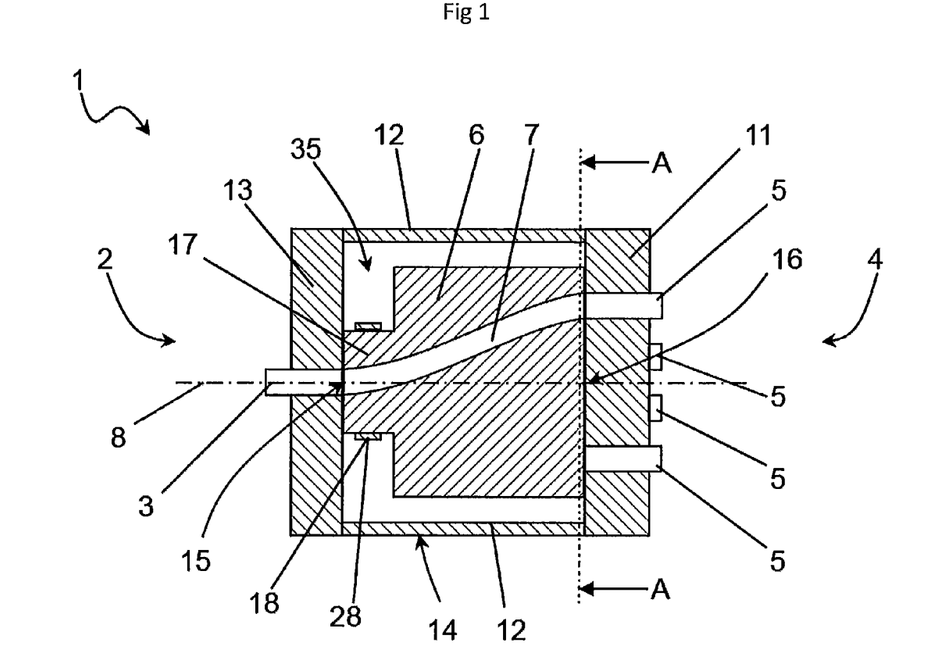
FIG. 1 shows a sectional side view of a switch according to the invention.

FIG. 1 shows a schematic sectional side view of a switch 1 according to the invention for an operating material. For the sake of better clarity, only the essential features of the switch 1 are illustrated. In particular seals, bearings, and similar components are not illustrated. In the exemplary embodiment shown, this type of switch 1 is employed in a pneumatic conveyor system, and is used to convert a first conveying line into a second conveying line, the second conveying line being selectable from various conveying lines. The pneumatic conveyor system includes a storage container, not shown, for a hot melt adhesive in granulate form, and a filling device, not depicted, for conveying the granulate by means of compressed air. The switch 1 is connected to the filling device via a conveying line, so that by means of a filling device and a switch 1, a plurality of application units, not shown, which are connected to the switch 1 may be supplied for melting and applying the hot melt adhesive.

The conveying line coming from the filling device is connected to an inlet opening 3 at an inlet side 2 of the switch 1. The inlet opening 3 is provided on a rear plate 13 of a housing 14 of the switch 1, and has customary connecting elements, for example a hose coupling, for the conveying line. In addition, the housing 14 includes side plates 12 which are connected to the rear plate 13. A front plate 11 is provided on an outlet side 4 opposite from the rear plate 13, and thus opposite from the inlet side 2, and has a plurality of outlet openings 5. In the sectional view shown, four outlet openings 5 are apparent. The overall switch 1 has six outlet openings 5 in the exemplary embodiment shown. In each case an application unit is connected to each outlet opening 5 via a conveying line, not shown. For this purpose, the outlet openings 5 have customary connecting elements, for example hose couplings, for the conveying lines. The inlet opening 3 has a circular cross section; in addition, a hollow cylindrical channel extends from the inlet opening 3 through the rear plate 13 in the direction of the front plate 11. The outlet openings 5 likewise have a circular cross section; here as well, hollow cylindrical channels which extend in each case through the front plate 11 in the direction of the rear plate 13 are connected to the outlet openings.

The housing 14 with the side plates 16 and the rear plate 13 and the front plate 11 encloses a cavity 35 in which an actuator 6, which is mounted so as to be rotatable about a rotational axis 8, is provided. The rotational axis 8 extends through the center point of the inlet opening 13, and runs orthogonally with respect to the rear plate 13 and the oppositely situated front plate 11. The circular outlet openings 5 lie in a plane radially spaced at the same distance from the rotational axis 8, and are arranged around the rotational axis 8 at uniform intervals with respect to one another. The actuator 6 is rotatably connected to the rear plate 13 via a rear pivot bearing 15, and to the front plate 11 via a front pivot bearing 16, and is thus rotatable about the rotational axis 8 relative to the housing 14. The actuator 6 has a channel 7 which extends from the rear area of the actuator 6 adjoining the rear plate 7, through the actuator, to the oppositely situated front area of the actuator 6 adjoining the front plate 11. The channel is hollow and has a circular cross section, the cross section corresponding to the inlet opening 3 and to the outlet opening 5. On the rear side, the channel 7 is situated at the transition to the rear plate 13 in such a way that the rotational axis 8 extends through the center point of the circular cross section of the channel 7. At the transition the channel 7 is thus provided concentrically with respect to the inlet opening 3, so that a granulate introduced through the inlet opening 3 is able to pass into the channel 7, unhindered by the inlet opening. In the direction of the outlet side 4, the channel 7 extends in a curve or at an angle, at least in areas, so that the distance of the channel 7, in the exemplary embodiment shown, more precisely the distance of the center point of the circular cross section of the channel 7, from the rotational axis 8 increases from the inlet side 3 toward the outlet side 6. In the sectional view shown, the channel extends in the shape of an elongated "S" from the inlet side 3 toward the outlet side 4. The course of the channel 7 is adjusted in such a way that at the transition of the actuator 6 to the front plate 11, the channel may be oriented concentrically with respect to one of the outlet openings 5 by rotating the actuator 6 about the rotational axis 8 in such a way that a granulate introduced through the inlet opening 3 is able to pass into the channel 7, unhindered by the inlet opening, and then through the selected outlet opening 5 for supplying an application unit. By further rotation of the actuator 6, the channel 7 may then be oriented with respect to a further inlet opening 5 in order to provide a different path for the introduced granulate and to supply a further application unit. The rotation of the actuator 6 takes place by means of a toothed belt 28, which with circumferential gear teeth 18 engages with a drive section 17 at the rear area of the actuator 6 and is drivable via a motor, not illustrated.

Figure 2:
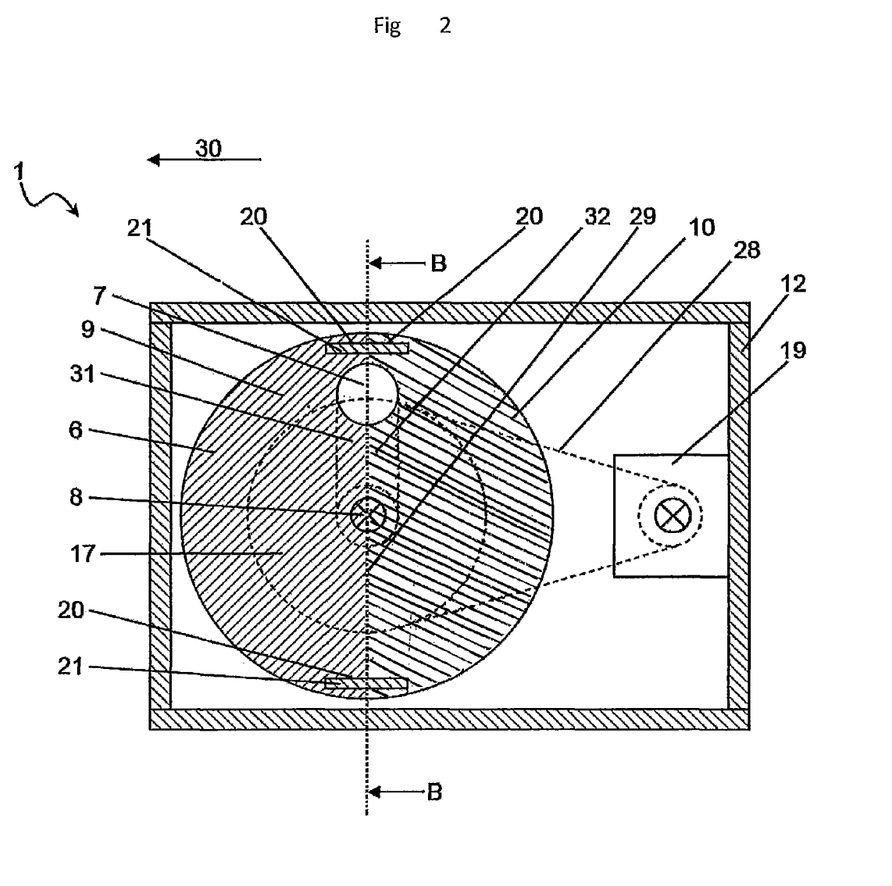
FIG. 2 shows a sectional view through the section line A-A of the switch from FIG. 1.

FIG. 2 shows a sectional view through the section line A-A of the switch 1 from FIG. 1. A drive motor 19 is apparent, which is mounted on a side plate 12 and has a drive shaft that rotates parallel to the rotational axis 8, via which drive shaft the actuator 6 is rotatable about the rotational axis 8 by means of the toothed belt 28, in order to be able to provide an option for connecting the above-described inlet opening 3 to one of the described outlet openings 5 via the channel 7. As discussed above, the toothed belt 28 engages with a drive section 17 in the rear area of the actuator 6. The basic shape of the actuator 6 is cylindrical, the drive section 17 and parts of the pivot bearings 15, 16 additionally adding to this basic shape. The actuator is made up of two parts, namely, a first half 9 and a second half 10, the channel 7 being defined by both parts 9, 10.

The actuator 6 is divided by a section plane 29 into the first half 9 and the second half 10, the section plane 29 at the same time forming a plane of symmetry for the two halves 9, 10 which have a mirror-symmetrical design with respect to one another. In the exemplary embodiment shown, the rotational axis 8 not only extends in parallel to the section plane 29, but also lies in the section plane 29. In addition, the section plane 29 separates the channel 7 into two equal halves which are mirror-symmetrically arranged about the section plane 29, namely, a first recess 31 in the first half 9 and a corresponding second recess 32 in the second half 10, wherein both recesses 31, 32 in the assembled state of the halves 9, 10 form the channel 7. The recesses 31, 32 are designed in such a way that undercuts in one of the halves 9, 10 may be dispensed with. Thus, the first recess 31 extends from the surface of the first half 9, which is provided on the section plane 29, into the first half 9 in a direction of extent 30 in such a way that the clearance of the recess 31 from the surface in the direction of extent 30 is constant or becomes smaller. The same likewise applies for the corresponding second recess 32 in the second half 10.

The two halves 9, 10 have boreholes 20 which extend from the surfaces provided in each case on the section plane 29, orthogonally with respect to the respective surface, into the corresponding half 9, 10. Each borehole 20 of the one half 9 is associated with a corresponding borehole 20 on the second half 10, so that by means of mounting pins 21 which extend in each case over two mutually corresponding boreholes 20 of the two halves 9, 10, fixing of the two halves 9, 10 for providing the actuator 7, and thus the closed channel 7, by the first recess 31 and the second recess 32 may be made possible.

Figure 3:
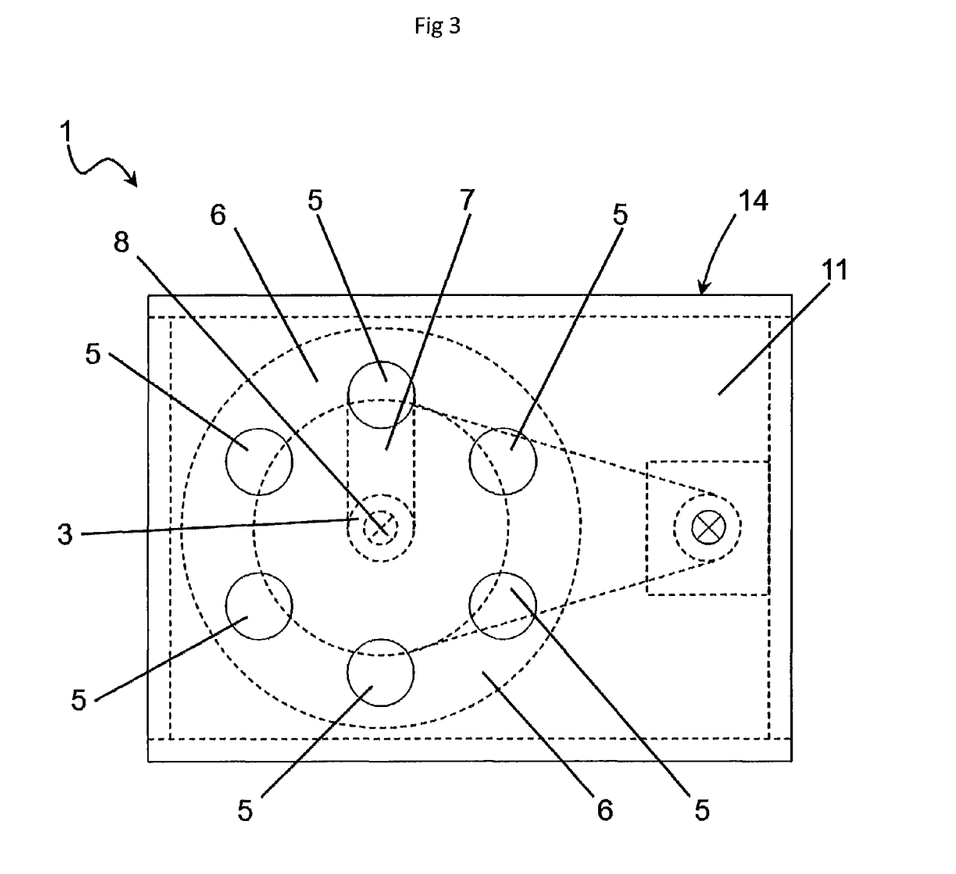
FIG. 3 shows a front view of the switch from FIG. 1.

FIG. 3 shows a front view of the switch 1 from FIG. 1. Apparent is the front plate 11 having the six circular outlet openings 5, which are arranged around the rotational axis 8 at uniform intervals with respect to one another and radially spaced at the same distance from the rotational axis 8. Dashed lines denote the channel 7 which extends from the central inlet opening 3 obliquely through the actuator 6, which allows an option for communication between the inlet opening 3 and the topmost outlet opening 5 in the exemplary embodiment shown.

Figure 4:
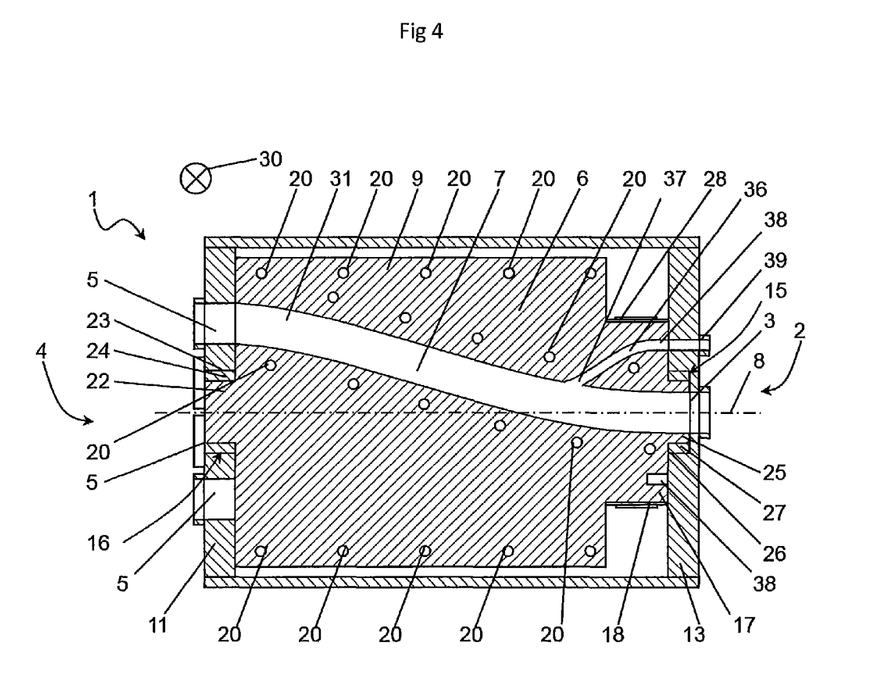
FIG. 4 shows a sectional view through the section line B-B of the switch from FIG. 2.

FIG. 4 shows a sectional view through the section line B-B of the switch 1 from FIG. 2 on the surface or interface of the first half 9 of the actuator 6 facing the section plane 29. The recess 31 of the first half, which partially defines the channel 7, is apparent here. The [ ] extends, wherein the clearance of the recess 31 from the surface in the direction of extent 30 is constant or becomes smaller in order to avoid undercuts in the first half 9 and to ensure ease of production. The recess 31, and thus also the channel 7, is aligned at the inlet side 2 with the inlet opening 3 through which the rotational axis 8 of the actuator 6 extends. In addition, the recess 31 extends through the first half 9, and thus the channel 7 also extends through the actuator 6 from the inlet side 2 to the outlet side 4, in such a way that the distance from the rotational axis 8 continuously increases, so that the channel 7 at the front area of the actuator may be brought into engagement with one of the outlet openings 5 radially spaced from the rotational axis 8, in order to allow an option for communication between the inlet opening 3 and a selected outlet opening 5 via the channel 7. For providing the actuator 6, the first half 9 is provided with a plurality of boreholes 20 which is used for accommodating the above-described mounting pins 21, which in turn engage in corresponding boreholes 20 of the second half 10. It is seen that a plurality of boreholes 20 is provided at the edge areas of the first half 9, but in addition a plurality of boreholes 20 which follows the course of the first recess 31 is also provided in the first half 9. This of course similarly applies to the second half 10, not shown.

The rotatable mounting of the actuator 6 about the rotational axis 8 takes place as described above, via a front bearing 16 and a rear bearing 15. The front bearing 16 includes a central bearing receptacle 23 on the front plate 11, having a ball bearing 24 which engages with a front bearing section 22 of the actuator 6 protruding in the manner of a peg. The rear bearing 15 in turn includes a central bearing receptacle 26 on the rear plate 13, having a ball bearing 27 which engages with a rear bearing section 25 of the actuator 6 protruding in the manner of a peg. Adjacent to the rear plate 13, the actuator 6 also has the drive section 17 together with the circumferential gear teeth 18, which provide an option for engagement for the toothed belt 28 already described.

For optimizing the conveying of the granulate within the channel 7, a compressed air channel 36 which extends through the drive section 17, and which via a channel opening 37 opens into the channel 7, is also provided in the rear area of the actuator 6. Compressed air can be blown into the channel 7 via the compressed air channel 36 to allow better conveying of the granulate in the direction of the outlet opening 5, or to allow optional cleaning of the channel 7. On the side of the actuator 6 facing the rear plate 13, the actuator has a compressed air connection gap 38 which radially encircles the rotational axis 8 and which opens into the compressed air channel 36. For acting on the compressed air connection gap 38, and thus for acting on the compressed air channel 36, with compressed air, at the corresponding level of the compressed air connection gap 38 the rear plate 13 has a compressed air inlet 39 having a connecting valve. Due to the use of a circumferential compressed air connection gap 38, the compressed air channel 36 may be supplied with compressed air, regardless of the position in which the actuator 6 has been rotated about the rotational axis 8. Alternatively, it is also possible to provide a plurality of compressed air connection options at the side of the actuator 6 facing the rear plate 13, which may open into the channel 7, for example via an above-described compressed air channel 36 in each case. The compressed air connection options preferably numerically correspond to the number of the outlet openings 5 of the switch 1, and are preferably arranged around the rotational axis 8 in such a way that a compressed air connection option engages with the compressed air inlet 39 when the channel 7 engages with one of the outlet openings 5.

In addition, the switch 1 that is shown has a sealing means on its front side facing the front plate 11 to allow a tight connection of the channel 7 to one of the outlet openings 5. This sealing means may be implemented in particular by a sealing plate, not depicted, between the actuator 6 and the front plate 11, which, after a desired position of the actuator 6 is reached, is pressed against the actuator by a servomotor by means of a threaded rod. The sealing plate preferably has a borehole which corresponds to the channel 7 and the outlet opening 5, and thus seals off the transition between the actuator 6 and the front plate 11. Further suitable sealing means for the switch 1 according to the invention 1 are found, for example, in DE 1556320 B1, the features of which in this regard supplement the present disclosure.

Figure 5:
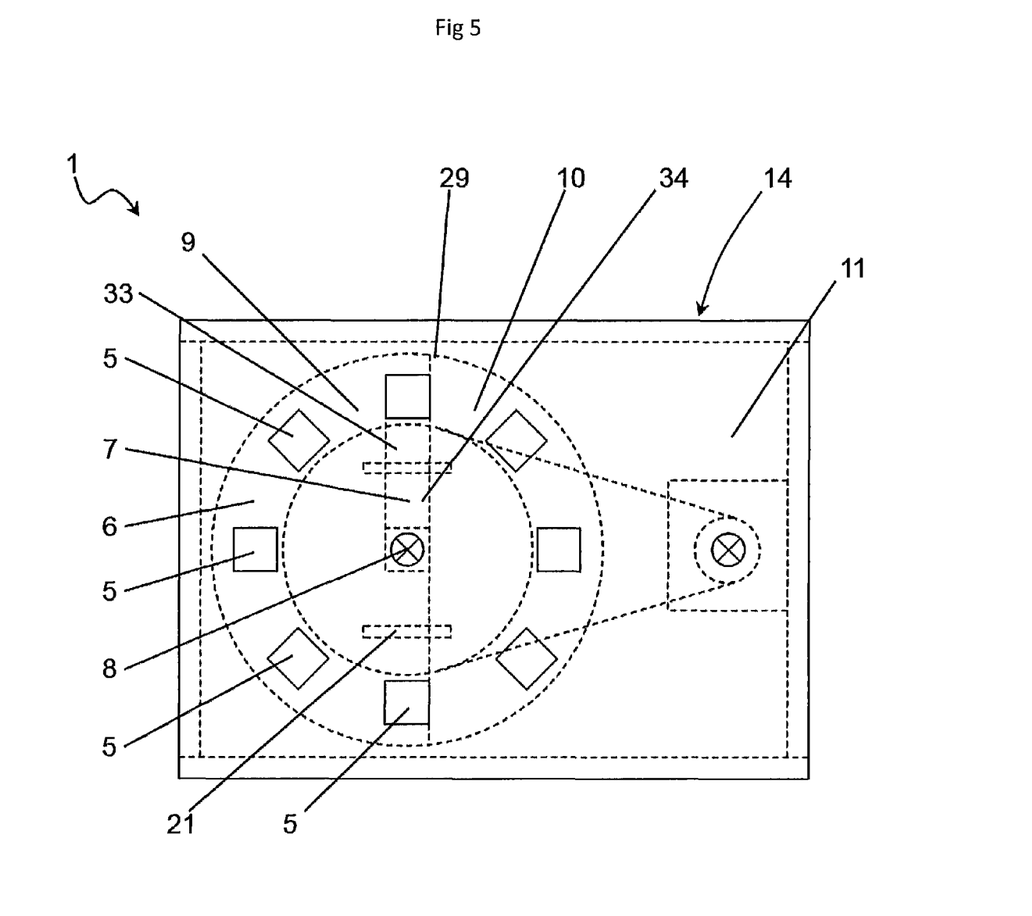
FIG. 5 shows a front view of an alternative switch.

FIG. 5 shows a front view of an alternative switch 1 which substantially corresponds to the switch 1 from FIGS. 1 to 4. However, the switch shown here differs on the one hand by the use of a square inlet opening 3 and a channel 7 having a corresponding square cross section. In addition, eight outlet openings 5 are provided on the depicted front plate 11, which likewise have a square cross section and are arranged at uniform intervals with respect to one another around the rotational axis 8 and radially spaced at the same distance from the rotational axis 8.

Furthermore, the halves 9, 10 of the actuator 6 do not have a mirror-symmetrical design about the section plane 29. Rather, only the first half has a recess 33 for providing the channel 7, wherein the surface or interface of the second half 10, lying in the section plane 29, forms a wall or delimiting surface 34 of the channel 7.

Of course, it is also possible for the actuator 6 to be divided into further parts. In addition, it is also possible to define or to form the channel 7 by the two halves 9, 10 only in areas. Moreover, it is in particular conceivable for the channel 7 to be formed in areas by only a part of the actuator 6. Thus, the channel 7 may in particular be designed partially as a borehole of a part of the actuator 6.

The embodiments of the invention described above are provided by way of example only. The skilled person will be aware of many modifications, changes and substitutions that could be made without departing from the scope of the present invention. The claims of the present invention are intended to cover all such modifications, changes and substitutions as fall within the spirit and scope of the invention.

What is claimed is:

1. A switch for an operating material, comprising an inlet opening for supplying an operating material at an inlet side, and a plurality of outlet openings for discharging the operating material at an outlet side, wherein an actuator having a connecting channel is provided between the inlet side and the outlet side, and is adjustable in such a way that an option for connecting the inlet opening to one of the outlet openings can be provided via the connecting channel, wherein the actuator is made up of at least two parts, each part will contact the operating material when the operating material is discharged, the connecting channel being defined, at least in areas, by both parts of the actuator.

2. The switch according to claim 1, wherein the connecting channel is defined by at least one recess in one of the parts of the actuator.

3. The switch according to claim 1, wherein the connecting channel is defined, at least in sections, by recesses in two adjoining parts of the actuator.

4. The switch according to claim 2, wherein the recesses of both parts are mirror-symmetrical, at least in areas.

5. The switch according to claim 1, wherein the recesses extend from a contact surface of the parts into at least one of the parts in a direction of extent, wherein the clearance of the recess from the surface in the direction of extent is constant or becomes smaller.

6. The switch according to claim 1, wherein the actuator is rotatable about a rotational axis.

7. The switch according to claim 6, wherein the contact surface of the parts extends in parallel to the rotational axis.

8. The switch according to claim 6, wherein the rotational axis extends through the opening of the connecting channel at the side of the actuator facing the inlet side.

9. The switch according to claim 6, wherein the connecting channel extends from the side of the actuator facing the inlet side to the opposite side of the actuator facing the outlet side, such that the distance of the connecting channel from the rotational axis increases, at least in areas.

10. The switch according to claim 1, wherein the actuator has at least one pressure medium channel which opens into the connecting channel via a channel opening to be able to supply a pressure medium into the connecting channel.

11. The switch according to claim 2, wherein the connecting channel is defined, at least in sections, by recesses in two adjoining parts of the actuator.

12. The switch according to claim 2, wherein the recesses extend from a contact surface of the parts into at least one of the parts in a direction of extent, wherein the clearance of the recess from the surface in the direction of extent is constant or becomes smaller.

13. The switch according to claim 3, wherein the recesses extend from a contact surface of the parts into at least one of the parts in a direction of extent, wherein the clearance of the recess from the surface in the direction of extent is constant or becomes smaller.

14. The switch according to claim 4, wherein the recesses extend from a contact surface of the parts into at least one of the parts in a direction of extent, wherein the clearance of the recess from the surface in the direction of extent is constant or becomes smaller.

15. The switch according to claim 2, wherein the actuator is rotatable about a rotational axis.

16. The switch according to claim 3, wherein the actuator is rotatable about a rotational axis.

17. The switch according to claim 4, wherein the actuator is rotatable about a rotational axis.

18. The switch according to claim 6, wherein the actuator is rotatable about a rotational axis.

19. The switch according to claim 7, wherein the rotational axis extends through the opening of the connecting channel at the side of the actuator facing the inlet side.

20. The switch according to claim 1, comprising:
a rear plate disposed around the inlet opening, the rear plate having a face adjacent the actuator at the inlet side, the rear plate face defining a gap radially spaced from the inlet opening and extending circumferentially around at least part of the inlet opening;
a pressure medium channel disposed within the actuator and fluidly connected to the connecting channel and the rear plate gap.

* * * * *